United States Patent [19]

Lustenberger

[11] Patent Number: 4,570,881
[45] Date of Patent: Feb. 18, 1986

[54] PROCESS FOR DETECTING THE LIKELIHOOD OF ICE FORMATION, ICE WARNING SYSTEM FOR CARRYING OUT THE PROCESS AND UTILIZATION THEREOF

[75] Inventor: Martin Lustenberger, Fribourg, Switzerland

[73] Assignee: Vibro-Meter SA, Fribourg, Switzerland

[21] Appl. No.: 607,526

[22] Filed: May 7, 1984

[30] Foreign Application Priority Data

Feb. 27, 1984 [CH] Switzerland ............................ 940/84

[51] Int. Cl.$^4$ .............................................. B64D 15/20
[52] U.S. Cl. ................................ 244/134 F; 340/582; 244/134 R
[58] Field of Search ........................ 244/134 R, 134 F; 340/580, 581, 582; 62/128, 139, 140

[56] References Cited

U.S. PATENT DOCUMENTS

| | | | |
|---|---|---|---|
| 3,240,054 | 3/1966 | Roth | 340/582 |
| 3,270,330 | 8/1966 | Weinberg | 340/582 |
| 3,276,254 | 10/1966 | Richard | 244/134 F |
| 3,341,835 | 9/1967 | Werner et al. | 340/582 |
| 3,541,540 | 11/1970 | Hughes | 244/134 F |
| 4,176,524 | 12/1979 | Kamiyama et al. | 340/582 |
| 4,290,299 | 9/1981 | Pozin | 73/17 A |

FOREIGN PATENT DOCUMENTS

| | | |
|---|---|---|
| 83962 | 7/1983 | European Pat. Off. |
| 101114 | 2/1984 | European Pat. Off. |
| 1397208 | 3/1965 | France |
| 1410442 | 8/1965 | France |
| 506843 | 6/1939 | United Kingdom ............... 340/582 |
| 762332 | 4/1983 | U.S.S.R. .......................... 244/134 F |

*Primary Examiner*—Trygve M. Blix
*Assistant Examiner*—Rodney Corl
*Attorney, Agent, or Firm*—Wender Murase & White

[57] ABSTRACT

An ice warning system comprising a diaphragm set into vibration at one of its frequencies of resonance by a piezoelectric cell. The diaphragm is coupled thermally to a metallic plate alternately cooled and heated respectively below and above the ambient temperature by Peltier elements connected to a reversible DC current generator. A microprocessor measures any variation of the resonance frequency caused by a deposit of ice on the diaphragm during the cooling or heating periods and delivers an alarm signal if this variation of frequency reaches and/or exceeds a predetermined value. The microprocessor controls the period, intensity and direction of the current delivered by the DC current generator as a function of the ambient temperature and the temperature of the diaphragm. The ice warning system is preferably utilized in the aeronautical field for indicating the likelihood of natural ice formation on the engines and the wings of aircraft.

21 Claims, 3 Drawing Figures

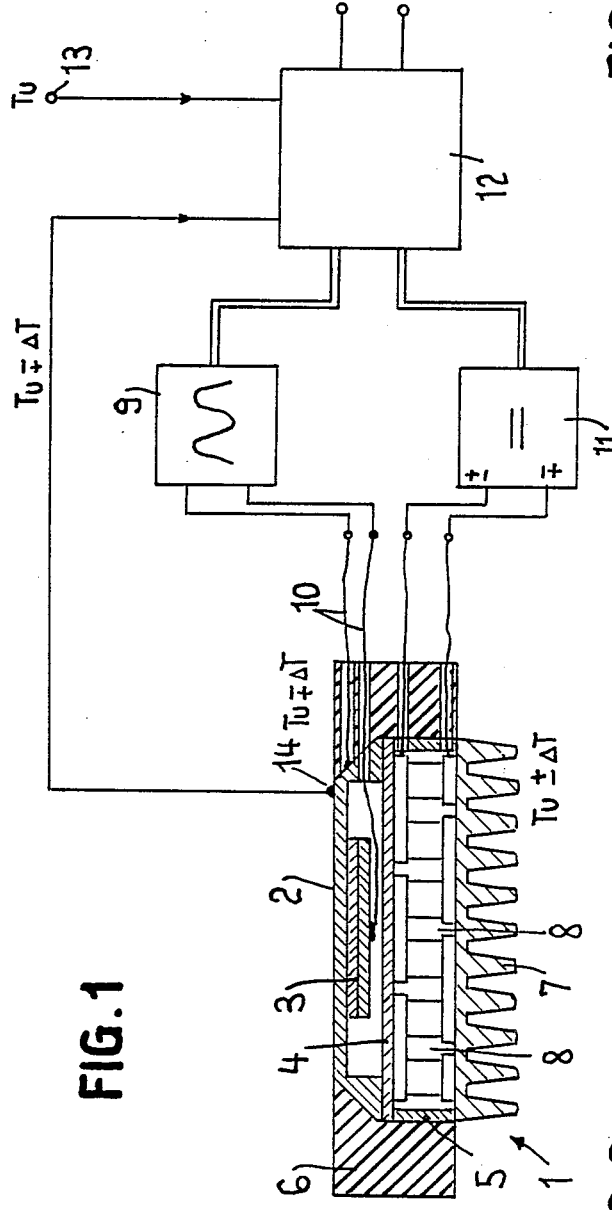
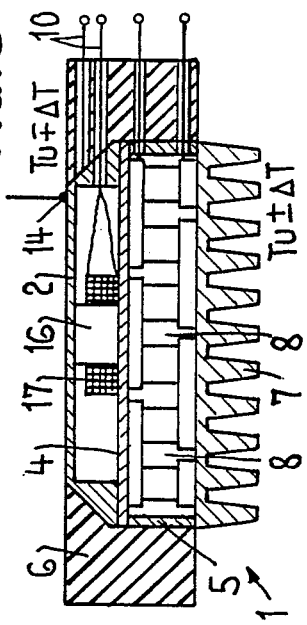
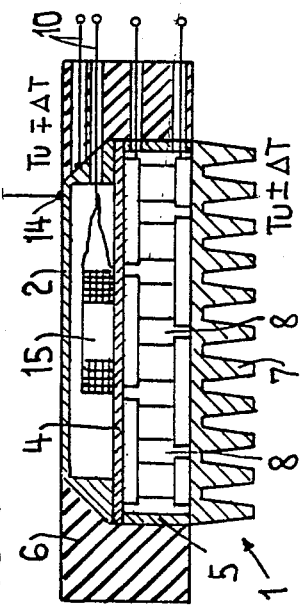
FIG.1
FIG.2
FIG.3

PROCESS FOR DETECTING THE LIKELIHOOD OF ICE FORMATION, ICE WARNING SYSTEM FOR CARRYING OUT THE PROCESS AND UTILIZATION THEREOF

BACKGROUND OF THE INVENTION

The present invention relates to a process for detecting the likelihood of ice formation. It also relates to a system for carrying out and utilizing the process.

The present invention enjoys a broad field of applications, including but not limited to avionics. For example, the present invention is useful for detecting the likelihood of ice build up on or in airplane engines or on the airplane wings. The present invention is also useful in connection with ice formation detection on ground and surface vehicles.

Previously, ice detection has generally been accomplished by indirect methods, such as by measuring the moisture in the air and the ambient temperature. However, such methods do not detect and measure the presence or likelihood of ice deposits.

SUMMARY OF THE INVENTION

It is therefore an object of the present invention to provide a process, and an ice warning system, capable of directly detecting and measuring the presence or likelihood of a deposit of ice.

In accordance with the present invention, an ice formation detection process is provided wherein a diaphragm, exposed to the build up of a deposit of ice, is excited into vibration at one of its frequencies of resonance. The diaphragm is alternately cooled and heated below and above the ambient temperature for respectively promoting the accretion of a deposit of ice and then causing the ice to melt. The variations in the frequency of resonance of the diaphragm caused by a deposit of ice are measured and an alarm is signaled if the variation of the frequency of resonance reaches a predetermined value. An ice warning system according to the invention comprises a first means connected to the diaphragm for causing it to vibrate at one of its frequencies of resonance, a second means coupled to the diaphragm for alternately cooling and heating it below and above the ambient temperature, measuring means for determining any variation in the frequency of resonance of the diaphragm caused by a deposit of ice on said diaphragm, and means for signaling an alarm indicating a likelihood of natural ice accretion whenever the variation in the frequency of resonance of the diaphragm reaches a predetermined value.

Due to the fact that the diaphragm upon which a deposit of ice may build up is set into vibration at one of its frequencies of resonance and that its frequencies of resonance are dependent on the mass and the stiffness of the diaphragm, any deposit of ice on the diaphragm will change its frequency of resonance. Therefore, measurement of any variation in the frequency of resonance provides an indication of the amount of the ice deposited. Moreover, alternately submitting the diaphragm to variations in temperature of a few degrees below and above the ambient temperature facilitates detection of any deposit of ice on the diaphragm whenever the ambient temperature is near the freezing point and detection of ice crystals whenever the ambient temperature is below the freezing point. An alarm indicating that a natural build up of ice on the diaphragm, and therefore on any airplane or ground vehicle involved, is likely to occur, is released whenever the variation in the frequency of resonance of the diaphragm reaches a predetermined value.

The invention will be described further by way of example and with reference to the accompanying drawings.

BRIEF DESCRIPTION OF THE DRAWINGS

FIG. 1 shows the schematic diaphragm of the ice warning system according to the invention, FIG. 2 shows another embodiment of the exciter of the diaphragm, and FIG. 3 shows a further embodiment of the exciter of the diaphragm.

DESCRIPTION OF THE PREFERRED EMBODIMENT

The ice warning system comprises a transducer 1 with a metallic diaphragm 2 on the internal side of which is fastened a piezoelectric cell 3. The application of an alternating voltage to the terminals of the piezoelectric cell sets the latter into vibration and this vibration is transmitted to the diaphragm to which it is fastened. The diaphragm 2 with the piezoelectric cell 3 is mounted to a metallic plate 4 lying on an insulator ring 6. The internal face of the ring 6 is closed by a ribbed heat sink 7. Peltier elements 8, thermally connected to the heat sink 7 and to the metallic plate 4, are disposed within the insulator ring 6 between the heat sink 7 and the metallic plate 4. The diaphragm 2 which lies upon the metallic plate 4 is also thermally coupled to this plate 4. The diaphragm 2 together with the piezoelectric cell 3 constitutes the frequency determining element of an oscillator 9 to which it is connected by leads 10. One of these leads is directly connected to the diaphragm 2 and the other is connected to the lower internal side of the cell 3. The Peltier elements 8 are connected to a DC current generator 11 the polarity of which is capable of being inverted. Finally, the oscillator 9 and the DC current generator 11 are connected to a microprocessor 12 which measures any variations in the frequency of the oscillator 9 and controls the period, magnitude and direction of the flow of the current from the generator 11. A temperature sensing probe 13 for measuring the ambient temperature Tu (illustrated schematically) is connected to the microprocessor 12. Another temperature probe 14 for measuring the temperature of the diaphragm 2 is also connected to the microprocessor 12. The microprocessor produces an alarm signal in case of a likelihood of ice formation. The ice warning system operates as follows.

The resonance frequency of the diaphragm 2 together with the piezoelectric cell 3 is given by the relationship;

$$\omega = \sqrt{\frac{f}{m}}, \text{ where}$$

$\omega$ = pulsation = $2\pi$·frequency
f = elastic constant
m = mass

With regard to the preceding formula there are two different cases: (a) the case in which the diaphragm is set into vibration at its fundamental frequency of resonance, and (b) the case in which the diaphragm is set into vibration at a higher harmonic such that the surface of the vibrating diaphragm comprises a certain number of nodes and antinodes. In the first case, if a layer of ice builds up on the diaphragm, the total mass m of the diaphragm and the piezoelectric cell increases due to the presence of ice, and in accordance with the above formula, the frequency of the oscillator 9 decreases. In the second case, the layer of ice which builds up on the diaphragm 2 increases its stiffness, thus increasing the value of f. Thus effect predominates upon the one corresponding to the increase of the mass m, so that the frequency of the oscillator 9 increases. This second case is particularly interesting because it has been ascertained that a deposit of ice only on the diaphragm leads to an increase in the frequency of the oscillator while a deposit of the other elements like water, oil or dirt leads to a decrease in the frequency due to the increase of the mass m. Thus, the present invention distinguishes between the build up of ice, which except in case (a), is indicated by an increase of the frequency of the oscillator 9, and the presence of other elements such as water, oil or dirt which are indicated by a decrease in oscillator frequency. All variations in the frequency of the oscillator 9 are measured by the microprocessor 12 and, if they reach and/or exceed a predetermined value, the microprocessor 12 signals an alarm indicating the likelihood of natural ice formation on the airplane or the ground vehicle involved. In other words, the present invention will indicate a likelihood of natural ice build up when the ambient temperature is near the freezing point, or of ice crystals adhering to a warm surface when the ambient temperature is below the freezing point. The resonant frequency of the diaphragm is preferably between 1 and 20 kHz.

A DC current generator 11 is connected to the Peltier elements and generates a current having a period, magnitude and direction of flow determined by the microprocessor 12 as a function of measurements of the ambient temperature measured by the probe 13 and the temperature of the diaphragm measured by the probe 14. For a given direction of current flow, the Peltier elements cool the diaphragm 2 to a few degrees below the ambient temperature Tu. If the ambient temperature is in the neighbourhood of the freezing point, a layer of ice may build up on the diaphragm which decreases or increases the frequency of the oscillator 9 as described previously. After a period of time, the polarity or the direction of flow of the current of the generator 11 is reversed and the Peltier elements heat the diaphragm 2 to a few degrees above the ambient temperature, causing any ice previously formed to melt. The alternation of the cooling and heating phases may be periodic, the duration of these phases being on the order of a few tens of seconds. This provides for a periodical repetition of the measurement. The transducer 1 is of relatively small dimensions so that its thermal inertia is small and the phases of cooling and heating of the diaphragm practically instantaneously follow the inversions of the direction of current flow from the DC generator 11. Thus, the device according to the invention gives a direct indication of the presence of a layer of ice on the diaphragm so that it can deliver an alarm before the occurrence of a natural deposit of ice.

In practice, particularly in the aeronautical field, at very low temperatures of e.g. $-20°$ C. or $-40°$ C., if an airplane is flying through a cloud of ice or supercooled water droplets, ice may not build up on the coolest parts of the airplane like the wings but in the vicinity of the warmer engine parts. In this case, an ice warning system according to the invention, which is mounted near the warmer engine parts, may become covered by a layer of ice during the heating phase of the diaphragm by the Peltier elements instead of during the cooling phase. However, in all cases, the frequency of the oscillator 9 decreases if the diaphragm is excited into vibration at its fundamental frequency of resonance and the frequency of the oscillator 9 increases if the diaphragm is excited into vibration at a higher harmonic.

As mentioned above, an ice warning system according to the invention may be particularly, although not exclusively, utilized in the aeronautical field. Preferably, a number of ice warning systems like the one described above are arranged at or near the engines and on the wings of the airplane. It is possible to associate one microprocessor with each transducer or, to provide one single central microprocessor for all transducers. If an alarm is signaled, the power of the engines may be increased in order to prevent any build up of ice on the engines and the conventional defrosting system in the wings and the engines may be switched on to the same end. If the ambient temperature rises above a determined value for which no risk of ice formation exists, the system is preferably switched off automatically by the microprocessor.

In the preceding description, in accordance with FIG. 1, the diaphragm is excited into vibration by a piezoelectric cell 3. FIG. 2 illustrates an alternate embodiment in which the diaphragm is excited into vibration e.g. electrodynamically by an inductive device 15 secured to the plate 4, the inductive device being connected to the oscillator 9 and having a gap with respect to the diaphragm 2 which is formed of a magnetic material. FIG. 3 shows a further embodiment in which a magnetostrictive element 16 is secured to the diaphragm 2, the element 16 being set into vibration by a coil 17 connected to the oscillator 9. The mechanical vibrations produced in the magnetostrictive element 16 are transmitted to the diaphragm 2 with the same frequency.

It is also possible to heat the diaphragm by a current of relatively strong intensity or by a hot gas delivered by a system of pipes to the transducers. A similar system of pipes in which cooling gas or liquids flow may be used for cooling the diaphragm.

I claim:

1. A process for detecting a likelihood of natural ice formation on the surface of a vehicle comprising the steps of:
    positioning a diaphragm having a resonant frequency of vibration on a surface of the vehicle which is exposed to natural ice formation;
    exciting said diaphragm at its resonant frequency of vibration;
    alternately cooling and heating said diaphragm to temperatures respectively below and above the ambient temperature in accordance with a predetermined, repetitious cycle to artificially create and then melt an accretion of ice when the ambient temperature is near or below the freezing point;
    measuring any variation in the resonant frequency of vibration of the diaphragm during said step of alternately and repetitiously cooling and heating the diaphragm;
    signaling an alarm whenever said variation exceeds a predetermined value.

2. The process according to claim 1, wherein the step of exciting the diaphragm at its resonant frequency of vibration produces a decrease in the resonant frequency in the presence of an accretion of ice.

3. The process according to claim 1, further comprising the step of exciting the diaphragm into vibration at a harmonic of its resonant frequency of vibration wherein the presence of an accretion of ice produces an increase of the resonant frequency when the diaphragm is excited into vibration at said harmonic.

4. A process for detecting a likelihood of natural ice formation on the surface of a vehicle comprising the steps of:
positioning a diaphragm, having a resonant frequency of vibration, on a surface of the vehicle which is exposed to natural ice formation;
exciting said diaphragm at its resonant frequency of vibration;
measuring the ambient temperature;
measuring the temperature of said diaphragm;
alternately cooling and heating said diaphragm to temperatures respectively below and above the ambient temperature in accordance with a cycle, the duration of the cycle being dependent on the measured ambient and diaphragm temperature for artificially creating and then melting an accretion of ice when the ambient temperature is near or below the freezing point;
measuring any variation in the resonant frequency of vibration of the diaphragm during said step of alternately cooling and heating the diaphragm;
signaling an alarm whenever said variation exceeds a predetermined value.

5. The process according to claim 4, wherein the step of exciting the diaphragm at its resonant frequency of vibration produces a decrease in the resonant frequency in the presence of an accretion of ice.

6. The process according to claim 4, further comprising the step of exciting the diaphragm into vibration at a harmonic of its resonant frequency of vibration wherein the presence of an accretion of ice produces an increase of the resonant frequency when the diaphragm is excited into vibration at said harmonic.

7. An ice warning system for detecting a likelihood of natural ice formation on a vehicle comprising:
a transducer adapted to be secured to said vehicle, said transducer comprising a diaphragm, and a vibration exciting means, said diaphragm being responsive to said vibration exciting means for vibrating at one of its frequencies of resonance, said vibration exciting means generating a vibration having a frequency equal to said frequency of resonance of said diaphragm;
means for measuring the ambient temperature in the vicinity of said vehicle;
means, thermally coupled to said diaphragm for alternately cooling and heating said diaphragm respectively below and above said ambient temperature, said alternate cooling and heating occurring in a predetermined, repetitious cycle which is operable, under conditions where natural ice formation is likely to occur, to artificially create an accretion of ice on said diaphragm during said cooling;
frequency measuring means coupled to said vibration exciting means for measuring any variation in the resonant frequency of said diaphragm; and
means responsive to said frequency measuring means, for signaling an alarm if the variation in the resonant frequency of the diaphragm exceeds a predetermined value.

8. The ice warning system according to claim 7, wherein said diaphragm has an upper exposed side and a lower protected side and wherein said vibration exciting means includes a piezoelectric cell secured to the lower, protected side of the diaphragm, said diaphragm and said piezoelectric cell comprising a frequency determining element of said vibration exciting means.

9. The ice warning system according to claim 7, wherein said diaphragm has an upper exposed side and a lower protected side and wherein said vibration exciting means includes a magnetostriction transducer secured to the lower, protected side of the diaphragm.

10. The ice warning system according to claim 7, wherein said diaphragm has an upper exposed side and a lower protected side and wherein said vibration exciting means includes an electrodynamic transducer coupled to the diaphragm.

11. The ice warning system according to claim 7, wherein said means for cooling and heating comprises Peltier elements, and further comprising a DC current generator operably connected to said Peltier elements for controlling the direction of current flow to said Peltier elements, said direction of current flow being alternately reversed for effecting said cooling and heating.

12. The ice warning system according to claim 11, further comprising a first probe for measuring the ambient temperature, a second probe for measuring the temperature of said diaphragm, a microprocessor responsive to said first and second probes for controlling the duration, magnitude and direction of flow of current from said DC current generator.

13. The ice warning system according to claim 11, wherein said reversal in the direction of the current flow from said DC current generator is periodic.

14. The ice warning system according to claim 7, wherein said diaphragm is responsive to said accretion of ice to decrease its resonant frequency when excited into vibration at its fundamental frequency of resonance.

15. The ice warning system according to claim 7, wherein said diaphragm is responsive to said accretion of ice to increase its resonant frequency when excited into vibration at a higher harmonics of its fundamental frequency of resonance.

16. The ice warning system of claim 12 wherein said microprocessor is operable to energize a de-icing system whenever the variation in the resonant frequency of the diaphragm exceeds said predetermined value.

17. The ice warning system according to claim 12, further comprising an oscillator, the frequency of which is determined by the resonant frequency of the transducer, for energizing said vibration exciting means, and wherein said frequency measuring means includes said microprocessor.

18. An ice warning system for detecting a likelihood of natural ice formation on a vehicle comprising:
a transducer adapted to be secured to said vehicle, said transducer comprising a diaphragm, and a vibration exciting means, said diaphragm being responsive to said vibration exciting means for vibrating at one of its frequencies of resonance;
means for measuring the ambient temperature in the vicinity of said vehicle;
means for measuring the temperature of said diaphragm;

a microprocessor, said ambient and diaphragm temperature measuring means being connected as inputs to said microprocessor;

means, thermally coupled to the diaphragm, for alternately cooling and heating said diaphragm, said alternate cooling and heating being operable for respectively cooling and heating said diaphragm below and above said ambient temperature, in a predetermined, repetitious cycle, said cycle being determined by said microprocessor in dependence on said ambient temperature and said diaphragm temperature and being operable to artificially create an accretion of ice on said diaphragm during said cooling;

means, connected to said microprocessor for measuring any variation in the resonant frequency of said diaphragm and for signaling an alarm if any variation in the resonant frequency exceeds a predetermined value.

19. The ice warning system according to claim 18 wherein said microprocessor is further operable to energize a de-icing system whenever the variation in the resonant frequency exceeds said predetermined value.

20. The ice warning system according to claim 18 wherein said accretion of ice on the diaphragm produces a decrease in the resonant frequency of the diaphragm when the diaphragm is excited into vibration at its fundamental resonant frequency.

21. The ice warning system according to claim 18 wherein said accretion of ice on the diaphragm produces an increase in the resonant frequency of the diaphragm when the diaphragm is excited into vibration at a frequency corresponding to a higher harmonics of its resonant frequency.

* * * * *